United States Patent [19]

Fulton

[11] 4,348,627
[45] Sep. 7, 1982

[54] INDUCTION MOTOR CONTROLLER WITH RAPID TORQUE RESPONSE

[75] Inventor: Donald E. Fulton, Stoneham, Mass.

[73] Assignee: The Charles Stark Draper Laboratory, Inc., Cambridge, Mass.

[21] Appl. No.: 133,414

[22] Filed: Mar. 24, 1980

[51] Int. Cl.³ .............................................. H02P 5/40
[52] U.S. Cl. .................................... 318/807; 318/809; 318/811
[58] Field of Search ............... 318/807, 808, 809, 810, 318/811, 800, 799

[56] References Cited

U.S. PATENT DOCUMENTS

| | | | |
|---|---|---|---|
| 3,671,831 | 6/1972 | Chausse et al. | 318/800 |
| 3,694,718 | 9/1972 | Graf et al. | 318/811 |
| 3,700,986 | 10/1972 | Cushman et al. | 318/800 |
| 3,796,935 | 3/1974 | Blaschke . | |
| 3,805,135 | 4/1974 | Blaschke . | |
| 3,824,437 | 7/1974 | Blaschke . | |
| 4,008,421 | 2/1977 | Bird et al. | 318/809 |
| 4,259,628 | 3/1981 | Iwakane et al. | 318/799 |

OTHER PUBLICATIONS

MacDonald, M. L. et al., "Control Loop of Induction Motor Drives Using DQ Model", IEEE IAS 1978 Annual Meeting Conference Record, pp. 897–903.

Nabe, A., "An Approach to Flux Control of Induction Motors Operated with Variable Frequency Power Supply", IEEE IAS 1979 Annual Meeting Conference Record, pp. 890–896.

*Primary Examiner*—David Smith, Jr.
*Attorney, Agent, or Firm*—Kenway & Jenney

[57] ABSTRACT

A control system for an induction machine. The system includes a multiphase variable frequency oscillator adapted to provide at least one pair of signals having frequencies proportional to the sum of a desired slip frequency and the frequency of rotation of the induction motor shaft, where the signals are in phase quadrature. A weighting network amplitude-scales one of each pair of signals by a factor related to the desired slip frequency. A summing network then generates an excitation signal for each stator winding by summing the amplitude-scaled signal and its associated quadrature signal corresponding to that stator winding.

7 Claims, 3 Drawing Figures

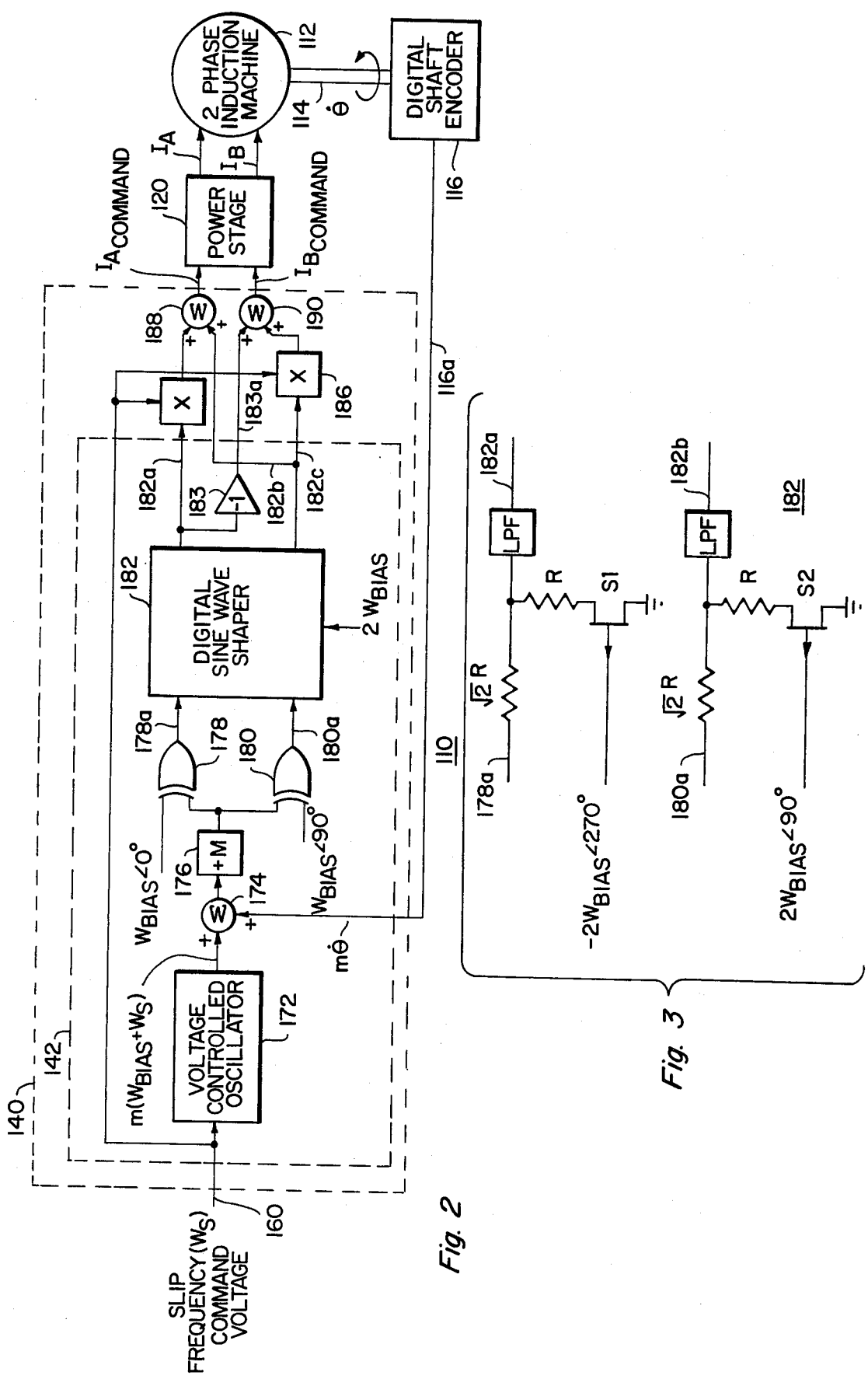

INDUCTION MOTOR CONTROLLER WITH RAPID TORQUE RESPONSE

FIELD OF THE INVENTION

This invention relates to induction motors, and more particularly, to networks for controlling the slip frequency and current of induction motors.

BACKGROUND OF THE DISCLOSURE

In general, an induction motor includes a stator having a drive or excitation coil assembly, and a rotor having shorted coil assembly with a plurality of pole pairs. Typically, the stator is stationary while the rotor is rotatable with respect to the stator and is coupled to an output shaft for the motor. The motor generates torque due to the interaction between the stator magnetic field and the rotor magnetic field. The magnetic field of the rotor is induced from the stator by rotating the stator field at a somewhat different rate than the rotor rate. The difference frequency between the shaft (times the number of pole pairs of the motor) and the stator field frequency is known as the slip frequency. This slip frequency is seen by the shorted turns on the rotor. It is well known that the slip frequency strongly influences the basic machine characteristics such as torque constant and efficiency.

In the prior art, control of the induction motor is generally achieved by employing a slip control loop, that is, a feedback loop around an induction motor that slaves the stator excitation frequency to be controlled in order to establish frequency difference above or below the shaft or rotor rotation frequency (times the number of motor pole pairs).

One conventional induction motor servo implementation linearly varies motor slip frequency, and non-linearly varies motor current in order to hold the motor flux constant. While such a system is typically known as a "constant flux" implementation, as usually implemented this description is accurate only under steady state conditions. The conventional configuration is based on the principle that a constant machine air gap flux causes torque to be an approximately linear function of slip frequency. While controllers based on these principles do display relatively good linearity, they are substantially limited in terms of dynamic performance. In particular, a significant lag occurs at low slip speeds. Moreover, the large signal performance also tends to be limited.

In the prior art U.S. Pat. No. 3,824,437 and variations disclosed in related U.S. Pat. Nos. 3,805,135 and 3,796,935, a form of induction servo controller is disclosed with relatively good dynamics. In these patents, the voltage across the machine terminals is sensed and used in the weighting of machine excitations. In effect, the stator excitation is controlled by a feedback system that forces current phase to be controlled by the machine voltage or flux. However, the networks required to perform this feedback function are relatively complex, and have limitations based on cost and reliability considerations.

It is an object of the present invention to provide an improved controller for an induction machine.

Another object is to provide an improved controller for an induction machine characterized by a linear response to a relatively large torque and speed range for the machine.

Yet another object is to provide an improved controller for an induction machine which provides a high speed response over a relatively full torque and speed range for the machine.

SUMMARY OF THE INVENTION

Briefly, the present invention is an open loop system for controlling an induction machine excitation, including its phase. It is known that conventional induction machine controllers are satisfactory in their steady state response, since steady state operation is relatively insensitive to phase. However, induction machines are phase sensitive to the short term, that is, during transients. For example, torque producing currents in the squirrel cage rotor of an induction machine respond with a relatively long time constant, known as the rotor time constant ($1/w_r$), which is typically several hundred milliseconds. As a result, for times less than 5–10 rotor constants (typically 1–3 seconds), the induction machine is sensitive to phase, as well as the amplitude and frequency of the stator drive currents.

According to the present invention, an induction motor controller provides stator drive signals for an induction motor with a phase term added to the steady state constant flux amplitude and frequency terms. As a result, the transient torque response of the controller for times less than 5–10 rotor time constants is substantially improved compared with the prior art approaches. The precise phase term required for a particular implementation is dependent upon the type of rotor construction, but in most forms, the phase of a first order lead with a break frequency at the rotor natural frequency ($w_r$) is sufficiently close for satisfactory operation. The addition of this phase term to the known amplitude and frequency terms causes the machine air gap flux to be nominally constant, even during transient periods.

In one form, an induction motor controller constructed according to the present invention is adapted to receive a slip frequency command signal representative of a desired slip frequency ($w_s$) for the motor. The system also is adapted to receive a shaft frequency signal $\theta$ representative of the rate of rotation of the motor output shaft, which signal may be provided conventionally by a tachometer coupled to the motor shaft. A variable frequency oscillator is responsive to both of these received signals, and provides at least one pair of associated signals, where the associated signals of each pair have frequencies proportional to the sum of the desired slip frequency and the shaft rotation rate, and those signals are in phase quadrature. A weighting network amplitude scales one signal of each of the pairs of associated signals by a factor proportional to the desired slip frequency. A vector summing network is responsive to the amplitude-scaled signal and its associated quadrature signal in each of the pairs to provide a stator command signal for the induction motor. In one form, this summing network may be a mixer. The resultant stator command signal is appropriately weighted in terms of amplitude and at the appropriate frequency for the motor, and further includes the additional phase term described above.

BRIEF DESCRIPTION OF THE DRAWINGS

The foregoing and other objects of this invention, the various features thereon, as well as the invention itself, may be more fully understood from the following description, when read together with the accompanying drawings in which:

FIG. 2 shows in block diagram form an alternative configuration embodying the present invention; and FIG. 3 shows an exemplary configuration for the digital sinewave shaper of FIG. 2.

DESCRIPTION OF THE PREFERRED EMBODIMENT

Figure 1:
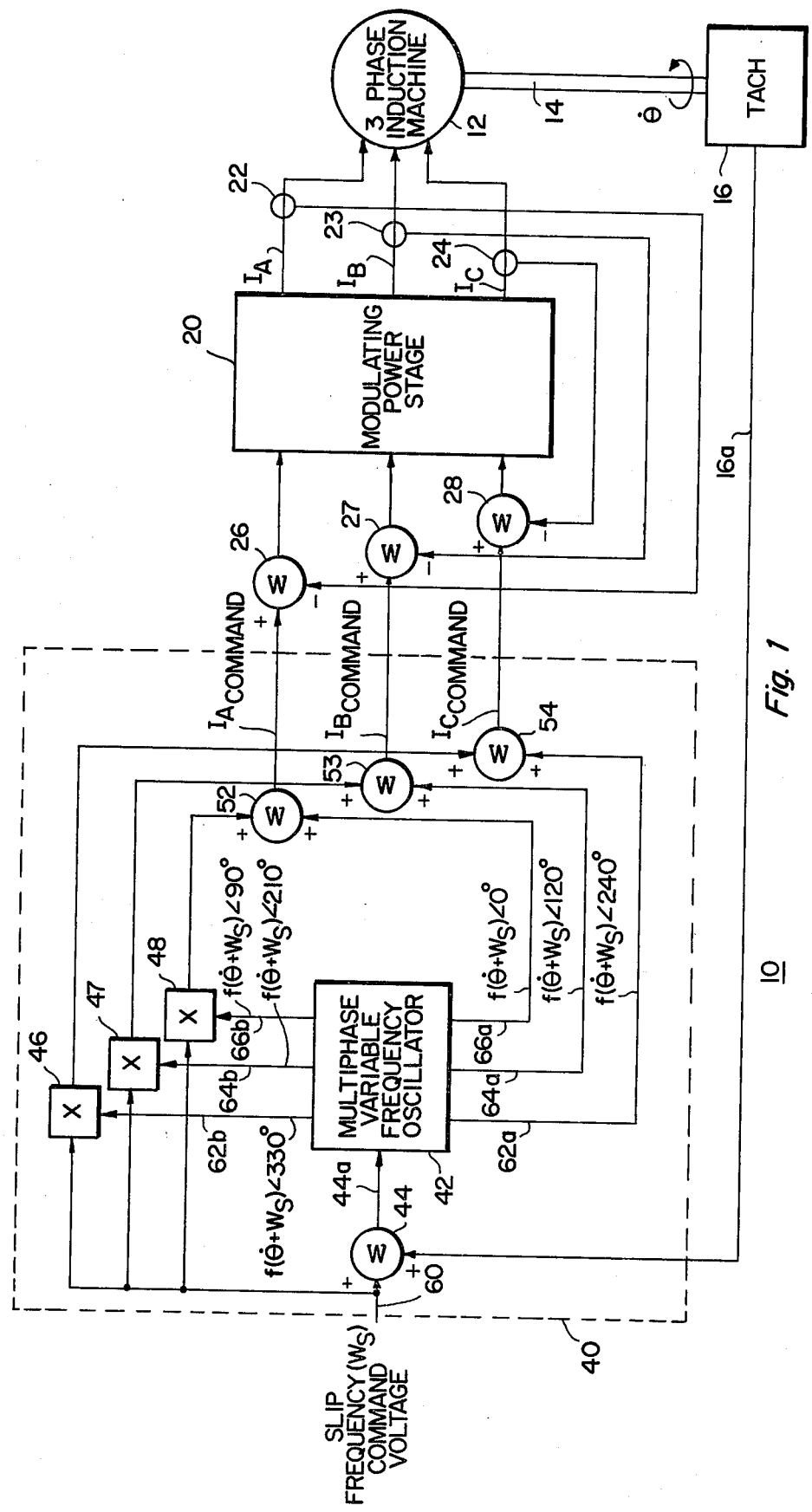
FIG. 1 shows in block diagram form an embodiment of the present invention.

FIG. 1 shows an exemplary embodiment of the present invention. In FIG. 1, the system 10 includes a conventional three-phase induction motor 12 (in a "delta" configuration) having an output shaft 14. An associated tachometer 16 provides a signal on line 16a having a frequency $\dot{\theta}$ related to the rate of rotation of the shaft 14. In the present embodiment, tachometer 16 is a conventional DC tachometer.

The configuration in FIG. 1 also includes a three line, modulating power stage 20 with each line having current feedback established by one of current sensors 22, 23 and 24 and one of difference networks 26, 27 and 28. For clarity, three current forcing loops are shown. However, in alternate forms of a three-wire motor connection, only two of the three current forcing loops are necessary where the third drive signal is generated from the other two signals. Such a modulating power stage is shown for example, in U.S. patent application Ser. No. 133,531, entitled Polyphase Motor Drive System with Balanced Modulation and filed on even date herewith. That application is incorporated herein by reference. This conventional power stage is merely exemplary, and provides a relatively fast response. Alternative forms of power stages may also be used to attain varying degrees of performance. For example, a current source inverter may be used with this configuration in an alternative configuration, wherein a first set of signals is required for establishing the frequency and phase of the stator currents, and a second set of signals is required for establishing the current amplitude. The command signals may then be derived conventionally, for example, by zero cross detecting to generate the frequency and phase switching commands, and full wave rectifying to produce the current amplitude command.

The system of FIG. 1 also includes the controller 40. Controller 40 includes a variable frequency multiphase oscillator 42, and input summing network 44, weighting networks 46, 47 and 48, and output summing networks 52, 53 and 54.

Controller 40 includes an input line 60 adapted to receive a slip frequency command voltage which is proportional to the desired slip frequency $w_s$. This signal is summed together with the shaft frequency signal from line 16a in the input summing network 44. The resultant signal to determine the stator excitation frequency $\dot{\theta}+w_s$ is applied by way of line 44a to the oscillator 42 to determine the stator excitation frequency $\dot{\theta}+w_s$. Oscillator 42 provides three pair of output signals on lines 62a and 62b, 64a and 64b, and 66a and 66b respectively. The frequency of the signals on all of these lines is proportional to the sum of shaft frequency $\dot{\theta}$ and the desired slip frequency $w_s$. The phases of the signals on lines 62a, 64a and 66a are 0°, 120° and 240° respectively. The signals on lines 62b, 64b and 66c are in phase quadrature with the associated signals on lines 62a, 64a and 66a respectively, lagging those signals by 90°.

The slip frequency command voltage from line 60 is applied to the weighting input of each of the weighting networks 46, 47, and 48, and serves to amplitude-scale the signals on lines 62b, 64b, and 66b, respectively, by the command voltage. The outputs of each of the networks 46, 47 and 48 are applied to the corresponding ones of summing networks 52, 53 and 54, where those signals are summed with the signals on lines 66a, 64a, and 62a, respectively to provide the command signals for the induction motor $I_{Acommand}$, $I_{Bcommand}$, and $I_{Ccommand}$.

With this configuration, the command signal $I_{Acommand}$ from network 52 is the sum of $\sin(\dot{\theta}+w_s)t$ and $(w_s/w_r)\cos(\dot{\theta}+w_s)t$, which has the form:

$$I_{Acommand} = \sqrt{1+(w_s/w_r)^2}\ \sin[(\dot{\theta}+w_s)t+\tan^{-1}(w_s/w_r)]$$

where $w_r$ is the rotor frequency, which corresponds to the rotor resistance divided by the sum of the magnetizing inductance and rotor leakage inductance. The networks 53 and 54 provide similar (but phase displaced) signals for $I_{Bcommand}$ and $I_{Ccommand}$.

While the disclosed DC slip loop of FIG. 1 is one form of the invention, there are other forms which may be used in keeping with the present invention. For example, the illustrated form of the present invention is adapted for a three phase motor. However, alternative forms may be readily adapted for two or other phase motors. Moreover, the present invention is fully compatible with incremental, pulse type tachometer with a digital implementation of the variable stator frequency oscillator, such as that disclosed in conjunction with U.S. patent application Ser. No. 70,856. That application is incorporated herein by reference.

FIG. 2 shows a digital form of the invention, including system 110 adapted for a two phase induction motor using a digital shaft encoder in place of the DC tachometer 16. The system 110 includes a two-phase induction motor 112 having an output shaft 114 coupled to a conventional digital shaft encoder 116, a conventional power stage 120 and a controller 140 and a multiphase variable frequency oscillator 142. Oscillator 142 includes a voltage controlled oscillator 172, frequency adder network 174, divider network 176, exclusive or gates 178 and 180, digital sinewave shaper 182, inverting amplifier network 183, weighting networks 184 and 186, and output summing networks 188 and 190.

By way of example, the digital sinewave shaper 182 may have the form shown in FIG. 3, including resistors R (denoted R and $\sqrt{2}$ R), FET switches (denoted S1 and S2), and low pass filters (denoted LPF). With this configuration, the exclusive OR gates 178 and 180 operate as pulse-width multipliers for the carrier signals applied to these gates. The output signals on lines 178a and 180a, from gates 178 and 180, respectively, include a low frequency beat note from the two carriers. In the embodiment of FIG. 3, shaper 182 provides a carrier-modulated amplitude weighting that substantially cancels the third and fifth harmonics from the beat note, so that the outputs on lines 182a and 182b are quasi-sinusoidal. In alternate embodiments, additional amplitude weighting switches may be used (in conjunction with appropriate frequency and phased switch control signals) to remove other harmonics so that the signals 182a and 182b more nearly approach a pure sinusoid.

In operation, the encoder 116 provides a pulse signal having a repetition rate equal to m times the shaft rotation rate, where m is an integer. The oscillator 172 is responsive to an applied slip frequency ($w_s$) control voltage on line 160 to generate an output signal having a frequency m times the sum of a bias frequency ($w_{BIAS}$) and $w_s$. Adder 174 and divider 176 combine to provide a signal having a frequency corresponding to $w_{BIAS}+w_s+\dot{\theta}$. This latter signal is applied to one input of gates 178 and 180. Quadrature square wave signals at $w_{BIAS}$ are applied to the other inputs of gates 178 and 180 to provide output signals from these gates at frequencies $w_s+\dot{\theta}$ and in phase quadrature. These signals are applied to the digital sinewave shaper 182, together with a clock signal at $2w_{BIAS}$, to generate a first pair of quasi-sinusoidal signals on lines 182a and 182b at the stator excitation frequency $\dot{\theta}+w_s$ and in phase quadrature, and a second pair of quasi-sinusoidal signals on lines 183a and 182c at the stator excitation frequency $\dot{\theta}+w_s$ and in phase quadrature. The signal from line 182a is applied to weighting network 184 where it is first amplitude-scaled by the slip frequency command voltage from line 160, and then applied to a first input of summing network 188. Similarly, the signal line 182c is applied to weighting network 186 where it is first amplitude-scaled by the slip frequency command voltage from line 160, and then applied to a first input of summing network 190. The signal from line 183a is applied to a second input of summing network 190, and the signal from line 182b is applied to a second input of summing network 188.

With this configuration, shaper 182, in effect, generates two pairs of quadrature quasi-sinewave signals at the stator excitation frequency, with the first signal of each pair being amplitude scaled by $w_s$ before being added to the second signal of that pair. As a result the current command signals from networks 188 and 190 correspond to the sum of the applied pair of signals, and have the form:

$$I_{Acommand} = \sqrt{1 + (w_s/w_r)^2} \; \sin[(\dot{\theta} + w_s)t + \tan^{-1}(w_s/w_r)]$$

$$I_{Bcommand} = \sqrt{1 + (w_s/w_r)^2} \; \cos[(\dot{\theta} + w_s)t + \tan^{-1}(w_s/w_r)]$$

In alternative configurations, the various phase relationships of the signals and inverting or non-inverting inputs of networks 188 and 190 may readily be provided by different but functionally equivalent networks, in order to generate the above vector sum current command signals.

The above-described embodiments provide stator current command signals for use with "delta" configuration motors. In alternate embodiments, corresponding stator volage command signals may be similarly generated for use with "wye" configuration motors.

In summary, the controller of the present invention provides amplitude-scaled quadrature signals which are summed to provide the stator command signals for an induction motor. With this configuration, a step in slip (torque) command to the controller simultaneously results in steps in stator frequency (and slip frequency), amplitude and phase. The motor flux remains constant during the transient, and thus this excitation is a "true constant flux excitation". A conventional pulse-width modulated power stage with current feedback may readily follow these steps in a few milliseconds (for a 60 Hz machine), thus providing rapid and accurate torque response. This high performance over a full scale torque range may be achieved without saturating the motor drive stage of typical systems.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A controller for an induction motor having an output shaft, comprising:
    means for receiving a slip frequency command signal representative of a desired slip frequency for said motor, $w_s$,
    means for receiving a shaft frequency signal representative of the rate of rotation of said shaft, $\dot{\theta}$,
    oscillator means responsive to said slip frequency command signal and said shaft frequency signal, said oscillator including means for generating at least one pair of associated signals, wherein the associated signals of each of said pairs have frequencies proportional to the sum of said desired slip frequency and said shaft rotation rate, $\dot{\theta}+w_s$, and are in phase quadrature,
    weighting means for amplitude scaling only one signal of each of said pairs of signals by a factor proportional to said desired slip frequency,
    adding means for generating stator command signals representative of the sum of each of said amplitude scaled signals and its associated quatrature signal.

2. A controller according to claim 1 wherein said shaft frequency signal is a pulse signal having a pulse repetition frequency equal to m $\dot{\theta}$, where m is an integer, and
    wherein said oscillator comprises:
    A. means responsive to said slip frequency command signal, for generating a first square wave binary signal having a frequency equal to $m(w_{BIAS}+w_s)$, where $w_{BIAS}$ is representative of a reference frequency,
    B. means responsive to said shaft frequency signal and said first square wave signal, for generating a second square wave signal having a frequency equal to $w_{BIAS}+w_s+\dot{\theta}$,
    C. means for transforming said second square wave signal to said pairs of associated signals.

3. A controller according to claim 2 wherein said transforming means comprises:
    at least two pulse width multipliers for generating said pairs of associated signals, each of said multipliers being responsive to said second square wave signal and a carrier square wave signal having a frequency equal to $w_{BIAS}$, wherein the carrier square wave signals for said multipliers have a predetermined phase relationship.

4. A controller according to claim 3 wherein said transforming means further comprises a sine wave shaper means responsive to the output signals from said multiplier means, for transforming said output signals to quasi-sinusoidal signals coresonding to said associated pairs of signals.

5. A controller according to claims 3 or 4 wherein said motor is two phase and said transforming means includes two pulse width multipliers and wherein said carrier square wave signals are in phase quadrature.

6. A controller according to claim 1 or 2 or 3 wherein said motor is three phase and said oscillator means generates at least two pairs of signals having frequency $\dot{\theta}+w_s$.

7. A controller according to claim 1 or 2 or 3 wherein said motor is two phase and said oscillator means generates at least two pairs of signals having frequency $\dot{\theta}+w_s$.

* * * * *